United States Patent
Nouri et al.

(10) Patent No.: US 12,380,881 B2
(45) Date of Patent: Aug. 5, 2025

(54) PROMPT GENERATION FOR GUIDED CUSTOM MACHINE LEARNING COLLABORATION

(71) Applicant: Microsoft Technology Licensing, LLC, Redmond, WA (US)

(72) Inventors: Elnaz Nouri, Seattle, WA (US); Swaroop Ranjan Mishra, Tempe, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 17/970,953

(22) Filed: Oct. 21, 2022

(65) Prior Publication Data

US 2024/0038226 A1 Feb. 1, 2024

Related U.S. Application Data

(60) Provisional application No. 63/393,687, filed on Jul. 29, 2022.

(51) Int. Cl.
*G10L 15/22* (2006.01)
*G10L 15/06* (2013.01)
*G10L 15/18* (2013.01)

(52) U.S. Cl.
CPC ........ *G10L 15/1815* (2013.01); *G10L 15/063* (2013.01); *G10L 15/22* (2013.01); *G10L 2015/0638* (2013.01); *G10L 2015/223* (2013.01)

(58) Field of Classification Search
CPC ... G10L 15/1815; G10L 15/063; G10L 15/22; G10L 2015/0638; G10L 2015/223; G06F 16/3329; G06F 40/35
See application file for complete search history.

(56) References Cited

U.S. PATENT DOCUMENTS

| 7,624,007 B2 | 11/2009 | Bennett |
| 9,348,817 B2 | 5/2016 | Bohra et al. |

(Continued)

FOREIGN PATENT DOCUMENTS

CN 115485696 A * 12/2022 ............ G06F 18/24

OTHER PUBLICATIONS

Brown, et al., "Language Models are Few-Shot Learners", In Proceedings of 34th Conference on Neural Information Processing Systems, Dec. 6, 2020, 25 Pages.

(Continued)

*Primary Examiner* — Abul K Azad

(57) ABSTRACT

Systems and methods relate to executing a task using a machine learning model based on prompt generation and collaborative interactions with a user. The machine language model generating a set of questions based on a task request. The user interactively answers the questions. A task processor generates a set of question-answer pairs based on the questions generated by the machine learning model and the answers given by the user. The machine learning model generates a task specific output based on the set of question-answer pairs. The machine learning model represents a large language model with deep learning. The simple question-and-answer prompts enable non-expert users to instruct the machine learning model with information that is sufficient to execute the task without overwhelming the users with the operations. The machine learning model leverages the answers to execute the task with accuracy, thereby providing efficacy of the prompting technique.

20 Claims, 9 Drawing Sheets

(56) References Cited

U.S. PATENT DOCUMENTS

| | | | |
|---|---|---|---|
| 10,360,265 B1* | 7/2019 | Agarwal | G10L 15/1815 |
| 2020/0004875 A1* | 1/2020 | McAteer | G10L 15/063 |
| 2021/0350285 A1* | 11/2021 | Malur Srinivasan | G06N 20/20 |
| 2022/0164538 A1* | 5/2022 | Bornea | G06F 40/30 |
| 2022/0318230 A1* | 10/2022 | Sikka | G06F 40/166 |
| 2023/0106590 A1* | 4/2023 | Di Fabbrizio | G06N 20/00 705/26.63 |
| 2023/0297887 A1* | 9/2023 | Gurgu | G06N 20/00 706/12 |

OTHER PUBLICATIONS

Chen, et al., "AdaPrompt: Adaptive Prompt-based Finetuning for Relation Extraction", In Repository of arXiv:2104.07650v1, Apr. 15, 2021, 9 Pages.

Chowdhery, et al., "Palm: Scaling language modeling with pathways", In Repository of arXiv:2204.02311v4, Sep. 29, 2022, pp. 1-87.

Efrat, et al., "The Turking Test: Can Language Models Understand Instructions?", In Repository of arXiv:2010.11982v1, Oct. 22, 2020, 12 Pages.

Gafni, et al., "Make-a-Scene: Scene-Based Text-to-Image Generation with Human Priors", In Repository of arXiv:2203.13131v1, Mar. 24, 2022, 17 Pages.

Gupta, et al., "Improving Zero and Few-shot Generalization in Dialogue through Instruction Tuning", In Repository of arXiv:2205.12673v1, May 25, 2022, 21 Pages.

Kuznia, et al., "Less is more: Summary of Long Instructions is Better for Program Synthesis", In Repository of arXiv:2203.08597v1, Mar. 16, 2022, 19 Pages.

Liu, et al., "Pre-train, prompt, and predict: A systematic survey of prompting methods in natural language processing", In Repository of arXiv:2107.13586v1, Jul. 28, 2021, pp. 1-46.

Luo, et al., "BioTABQA: Instruction Learning for Biomedical Table Question Answering", In Repository of arXiv:2207.02419v1, Jul. 6, 2022, 14 Pages.

Mishra, et al., "Cross-Task Generalization via Natural Language Crowdsourcing Instructions", In Proceedings of the 60th Annual Meeting of the Association for Computational Linguistics vol. 1: Long Papers, May 22, 2022, pp. 3470-3487.

Mishra, et al., "Help Me Think: A Simple Prompting Strategy for Non-experts to Create Customized Content with Models", In Repository of arXiv:2208.08232v1, Aug. 17, 2022, 54 Pages.

Mishra, et al., "Reframing Instructional Prompts to GPTk's Language", In Findings of the Association for Computational Linguistics: ACL 2022, May 22, 2022, pp. 589-612.

Nye, et al., "Show Your Work: Scratchpads for Intermediate Computation with Language Models", In Repository of arXiv:2112.00114v1, Nov. 30, 2021, 16 Pages.

Ouyang, et al., "Training Language Models to Follow Instructions with Human Feedback", In Repository of arXiv:2203.02155v1, Mar. 4, 2022, 68 Pages.

Parmar, et al., "In-BOXBART: Get Instructions into Biomedical Multi-Task Learning", In Repository of arXiv:2204.07600v1, Apr. 15, 2022, 17 Pages.

Perez, Ethan, "Finding and Fixing Undesirable Behaviors in Pretrained Language Models", A dissertation submitted In partial Fulfillment of the Reqirements for the Degree of Doctor of Philosophy Department of Computer Science New York University, Mar. 2022, 217 Pages.

Reif, et al., "A Recipe For Arbitrary Text Style Transfer with Large Language Models", In Repository of arXiv:2109.03910v3, Nov. 8, 2021, 12 Pages.

Scao, et al., "How Many Data Points is a Prompt Worth?", Proceedings of the Conference of the North American Chapter of the Association for Computational Linguistics: Human Language Technologies, Mar. 15, 2021, pp. 2627-2636.

Wang, et al., "Benchmarking Generalization via In-Context Instructions on 1,600+ Language Tasks", In Repository of arXiv:2204.07705v2, Apr. 29, 2022, 22 Pages.

Wang, et al., "InstructionNER: A Multi-Task Instruction-Based Generative Framework for Few-shot NER", In Repository of arXiv:2203.03903v1, Mar. 8, 2022, 11 Pages.

Wang, et al., "Self-Consistency Improves Chain of Thought Reasoning in Language Models", In Repository of arXiv:2203.11171v3, Oct. 4, 2022, 24 Pages.

Wei, et al., "Chain of Thought Prompting Elicits Reasoning in Large Language Models", In Repository of arXiv:2201.11903v5, Oct. 10, 2022, 43 Pages.

Wei, et al., "Finetuned language models are zero-shot learners", In Repository of arXiv:2109.01652v4, Dec. 2, 2021, pp. 1-47.

Weller, et al., "Learning from Task Descriptions", In Repository of arXiv:2011.08115v1, Nov. 16, 2020, 14 Pages.

Zhong, et al., "Adapting Language Models for Zero-shot Learning by Meta-tuning on Dataset and Prompt Collections", In Repository of arXiv:2104.04670v5, Sep. 8, 2021, 26 Pages.

Zhou, et al., "Least-to-Most Prompting Enables Complex Reasoning in Large Language Models", In Repository of arXiv:2205.10625v2, Oct. 6, 2022, 63 Pages.

Sanh, et al., "Multitask Prompted Training Enables Zero-Shot Task Generalization", In Repository of arXiv:2110.08207v1, Oct. 15, 2021, pp. 1-161.

"Call for Main Conference Papers", Retrieved From : https://web.archive.org/web/20220519160054/https://2022.emnlp.org/calls/main_conference_papers/, May 19, 2022, 11 Pages.

"A Robot Wrote this Entire Article. Are You Scared Yet, Human?", Retrieved From : https://www.theguardian.com/commentisfree/2020/sep/08/robot-wrote-this-article-gpt-3, Sep. 8, 2020, 7 Pages.

Thunstrom, et al., "Can GPT-3 Write an Academic Paper on Itself, with Minimal Human Input?", Retrieved From : https://hal.archives-ouvertes.fr/hal-03701250/document, Jun. 21, 2022, 8 Pages.

Hao, et al., "Recent Progress in Leveraging Deep Learning Methods for Question Answering", In Proceedings of Neural Computing and Applications, vol. 34, Issue 4, Jan. 16, 2022, pp. 2765-2783.

"International Search Report and Written Opinion issued in PCT Application No. PCT/US2023/025097", Mailed Date: Sep. 11, 2023, 13 Pages.

* cited by examiner

Task: A Wedding Invite

Prompt to user:
I am an expert in generating a wedding invite. I ask questions to gather information. Then, I use the information to generate a wedding invite for you.

Please answer the following questions:
1. Who is hosting the wedding?
2. What is a name of the bride?
3. What is a name of the groom?
4. When does the wedding take place?
5. What is the location where the wedding is to take place?
6. What is the dress code for the wedding?
Answer Choices:
A) Formal
B) Semi-formal
C) Casual

FIG. 4A

Task: A Wedding Invite

Prompt to user:
I am an expert in generating a wedding invite. I ask questions to gather information. Then, I use the information to generate a wedding invite for you.

Please answer the following questions:
1. Who is hosting the wedding?
John Doe 2. What is a name of the bride?
Jeal Anderson 3. What is a name of the groom?
John Doe 4. When does the wedding take place?
10am on August 14, 2022

5. What is the location of the wedding?
The Seattle Wedding Place

6. What is the dress code for the wedding?
A) Formal

Command:
Write a wedding invite based on the questions and the answers above.

FIG. 4B

Task: A Wedding Invite

Command:
Write a wedding invite based on the questions and the answers above.

Task Specific Output:

Together with their families,

John Doe and Jeal Anderson request your presence at their

Wedding at 10 o' clock in the morning of

14th August 2022, at Seattle Wedding Place.

Reception to follow.

Formal attire (e.g., morning dress) is requested.

FIG. 4C

PROMPT GENERATION FOR GUIDED CUSTOM MACHINE LEARNING COLLABORATION

CROSS-REFERENCE TO RELATED APPLICATIONS

This application claims priority to and the benefit of U.S. Provisional Patent Application No. 63/393,687, filed on Jul. 29, 2022, the disclosure of which is hereby incorporated herein by reference in its entirety.

BACKGROUND

It has become a common place for people to interact with smart devices and computers to execute tasks ranging from simple to complex. A part of interacting with smart devices includes instructing one or more machine learning models that are implemented in the devices to execute tasks. User interactions with machine learning models are based on various prompting techniques used by the devices. In practice, non-expert users often face difficulties in efficiently and accurately instructing a machine learning model to perform a task. The difficulties often originate from an issue where the non-expert users are not aware of specific types of content or instructions needed to instruct the machine learning models to generate an output that is in line with user expectations. The types and content and instruction vary depending on specific tasks.

In a typical scenario, a user utters a command with some associated data to the device with a machine learning model to execute a task. the user may further instruct the machine learning model to revise (e.g., remove and/or add) content of the output generated by the machine learning model based upon the task. The need to make modifications to the output are often time consuming. Accordingly, there has been a need to improve a prompting technology to improve efficacy of using a machine learning model to execute tasks, particularly when the type of tasks varies.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to executing a task for generating content, such as, for example a document, a video, an email. In particular, the disclosed technology is directed to automatically generating a plurality of questions based on a given area of a task.

Aspects of the disclosure utilizes a machine learning model to generate question prompts based upon a specific task. Upon identifying a task, a machine learning model generates task related questions in order to collect information from a user that can be used to complete the task. Aspects of the present disclosure can be employed to generate output related to various different tasks based upon answers received in response to generating the question prompts.

The machine learning model generates a set of question-answer pairs based on a given specific task and then extracts questions from the set of question-answer pairs to generate the question prompts that relate to the specific task. A task processor provides the question prompts and receives one or more answers to the question prompts. The task processor generates a modified set of question-answer pairs. The machine learning model uses the modified set of question-answer pairs to generate task specific output.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 4A depicts an exemplary user interface for displaying question prompts.

FIG. 4B depicts an exemplary user interface in which answers question prompts may be received.

FIG. 4C depicts an exemplary user interface which displays task specific output in response to receiving the answers.

DETAILED DESCRIPTION

Figure 1:
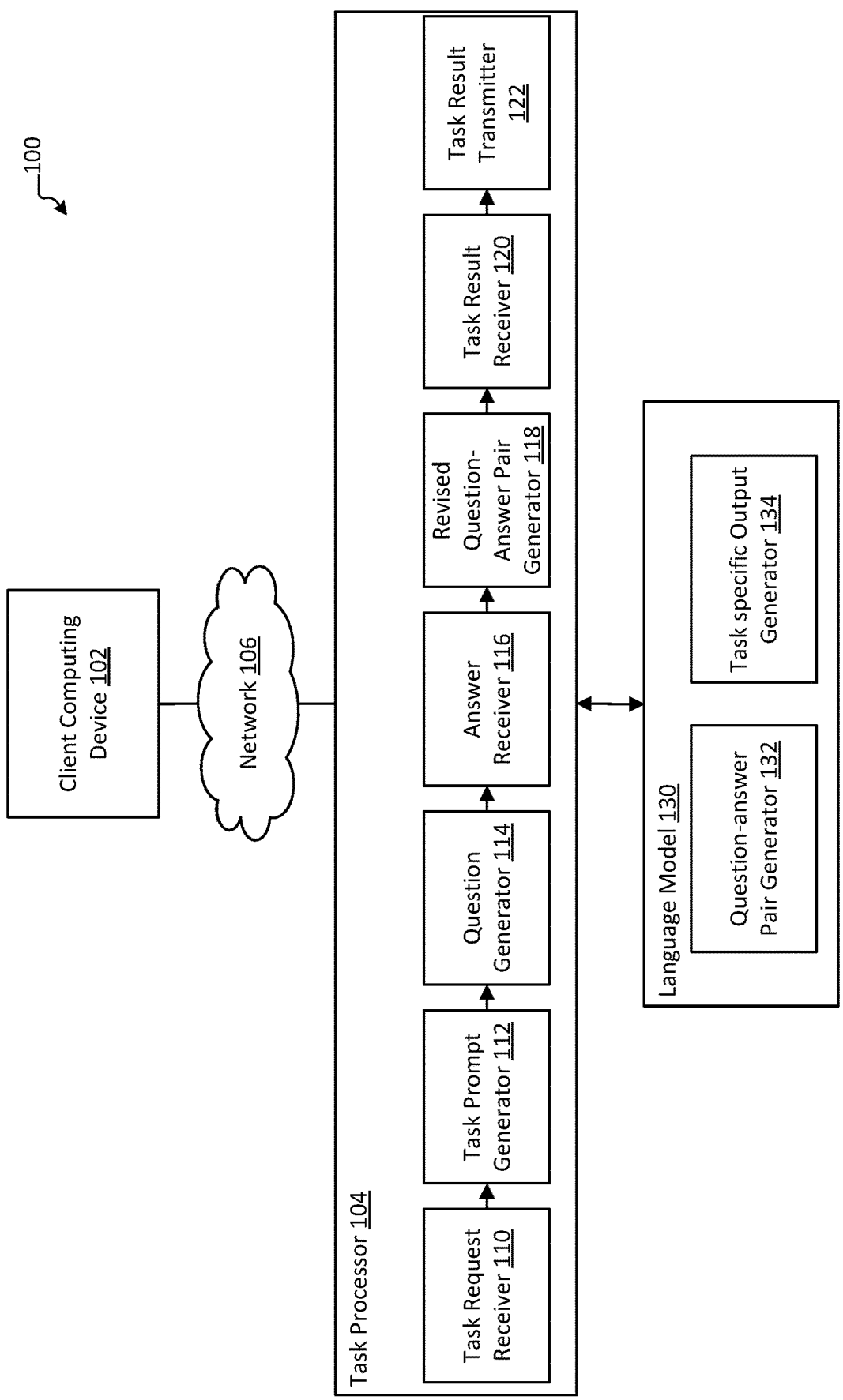
FIG. 1 illustrates an overview of an example system for executing a task by generating a plurality of questions associated with the task in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

The efficacy of prompting techniques is dependent on a specific type of an associated task. In general, applications or users employing prompting techniques when working with a machine learning model expect the machine learning model to solve the task as completely as possible. However, most applications or users do not have the expertise required to develop machine learning models, nor the expertise required to correct machine learning models in situations where the models produce incorrect output. The lack of expertise limits their adoption in applications involving customization/personalization which require significant expert input. Furthermore, training the machine learning model for specific purpose or specific tasks is time-consuming when the machine learning model has been extensively trained for general purposes Aspects of the present disclosure relate to utilizing a machine learning model to generate question prompts based upon a specific task. Upon identifying a task, a machine learning model generates task related questions in order to collect information from a user that can be used to complete the task. Various different types of generative machine learning models may be employed by aspects disclosed herein, such as, a transformer model, an autoregressive language model, a logic learning machine (LLM) model, etc. Aspects of the present disclosure can be employed to generate output related to various different tasks based upon the answers received in response to the question prompts. Examples of tasks include, but are not limited to, generating a user biography, generating travel plans, generating dialog, generating written works (e.g., poems, stories, etc.), generating event summaries, or the like. One of skill in the art will appreciate that while specific tasks are described herein, the aspects disclosed herein are operable to perform other types of tasks using an unsupervised generative model. However, aspects disclosed herein may also be employed using task specific models. That is, various different machine learning models trained to perform specific tasks, or multiple tasks, may be employed to produce any type of task specific output without departing from the scope of this disclosure.

Aspects of the present disclosure utilize generative models that are trained using a general unsupervised training process. That is, in examples disclosed herein, generative machine learning models are employed to perform tasks that the generative models were not specifically trained to perform a specifically requested task. That is, the generative models employed herein are operable to perform tasks that the generative models were not specifically trained to perform during the unsupervised training process.

FIG. 1 illustrates an overview of an example system 100 for executing a task by generating a plurality of questions associated with the task in accordance with aspects of the present disclosure. System 100 includes client computing device 102, task processor 104, and network 106 connecting the client computing device 102 and the task processor 104. The task processor 104 connects with language model 130. The task processor 104 includes task request receiver 110, task prompt generator 112, question generator 114, answer receiver 116, revised question-answer pair generator 118, task result receiver 120, and task result transmitter 122.

The language model 130 may be a large language model, including question-answer pair generator 132 and task specific output generator 134. In examples, the large language model includes an autoregressive model that uses deep learning based on a transformer network, however, various types of machine learning models may be employed without departing from the scope if this disclosure. The language model is trained to perform a variety of tasks including summarizing texts, generating question-answer pairs, and answering questions. Training data may include hundreds of billions of tokens.

The client computing device 102 communicates with the task processor 104 to request execution of a task. Examples of tasks include generating one or more documents including but not limited to an event announcement, a biography, an essay, and the like. The client computing device 102 interactively receives the requests from a user.

The task processor 104 uses the language model 130 to execute a task in response to receiving a request for executing the task from the client computing device 102 for executing the task. The task request receiver 110 receives a task request. The task request specifies a type of task for which an execution is requested. The task prompt generator 112 generates a prompt to the user using the client computing device 102. The prompt may describe the next course of action in executing the task and/or request information associated with the task. For example, when a task request is to generate a wedding invite, the prompt states, "I am an expert in generating a wedding invite. I ask questions to gather information. Then, I use the information to generate a wedding invite for you." The task prompt generator 112 may store a template for generating the prompt. The task prompt generator 112 transmits the generated prompt to the client computing device 102 for display.

The question generator 114 instructs the language model 130 to generate a set of question-answer pairs associated with the task. For example, when the task is to generate a wedding invite, the question generator 114 instructs the language model 130 to generate a list of question-answer pairs based on a knowledge base of the language model 130. In examples, the list is exhaustive and the pairs are mutually exclusive. In aspects, the language model 130 represents a large natural language processing model including a deep learning model that has been trained using hundreds of millions of tokens as training data. In aspects, the question-answer pair generator 132 of the language model 130 generates the set of question-answer pairs that sufficiently cover aspects of training data. For example, the set of question-answer pairs for the task of generating a wedding invite sufficiently covers elements that are typically in wedding invites according to the large training data. Examples of elements associated with a wedding invite include names of bride and groom, a date and a location of the wedding, a dress code, and the like.

The question generator 114 receives the set of question-answer pairs from the language model 130 and generates a set of questions from the set of question-answer pairs by extract only the questions. The question generator 114 then transmits the generated list of questions to the client computing device 102 for display and interactive input of answers to the respective questions. In aspects, questions in the list of questions may be displayed all at once to the user on the client computing device 102. Additionally, or alternatively the questions may be displayed one by one or in groups of questions in a predetermined sequence. The user is asked to enter answers to the questions.

The answer receiver 116 receives answers to the respective questions from the client computing device 102. In aspects, the answer receiver 116 receives all answers to all of the questions in the set of questions at once from the client computing device 102. In some other aspects, the answer receiver 116 receives one or more answers to a part of the set of questions at a time. Additionally, or alternatively, the answer receiver 116 requests answer(s) to unanswered questions or questions with answers that are incomplete. The answer receiver 116 may use a predetermined set of rules to determine whether a received answer is sufficient for use as a part of question-answer pairs to instruct the language model 130 to execute a task. For example, the answer receiver 116 may determine an answer as in sufficient when the answer is not related to a topic that is within a predetermined level of similarity to semantics of a topic associated with the question. In aspects, the answer receiver determines that the answer is within a predetermined level of similarity to semantics of the topic by using the language model. In another example, the answer receiver 116 may determine an answer that is not in a predetermined type (e.g., a number) by a question as an incomplete answer to the question.

The revised question-answer pair generator 118 generates a set of question-answer pairs based on the set of questions and corresponding answers that have been received from the client computing device 102. In aspects, the questions in the generated set of questions are substantially the same as those questions in the set of question-answer pairs that have been originally generated by the language model 130. The revised question-answer pair generator 118 generates the set of question-answer pairs by replacing answers of the originally generated set of question-answer pairs by the answers that have been received from the client computing device 102. Accordingly, the revised question-answer pair generator 118 transmits the revised set of question-answer pairs to the language model 130 for generating a task specific output.

The task specific output generator 134 receives the revised set of question-answer pairs including the answers received from the client computing device 102 (e.g., answered received via a user interface) and generates the task specific output. For example, the task specific output generator 134 receives a set of question-answer pairs that include answers from the user about a wedding invite and generates a wedding invite as a task specific output. The language model 130 uses a machine learning model to generate a task specific output that corresponds to a probability of confidence above a predetermined threshold. The task specific output may be in a form of a natural language. For example, the task specific output generator 134 generates a wedding invite expressed in a natural language form based on the received list of question-answer pairs.

The task result receiver 120 receives the task specific output from the task specific output generator 134 of the language model 130. For example, the task result receiver 120 receives a wedding invite in a natural language text.

The task result transmitter 122 transmits the task specific output over the network 106 to the client computing device 102 for display. For example, the task result transmitter 122 transmits text data that represents the wedding invite for display on the client computing device 102.

Figure 2:
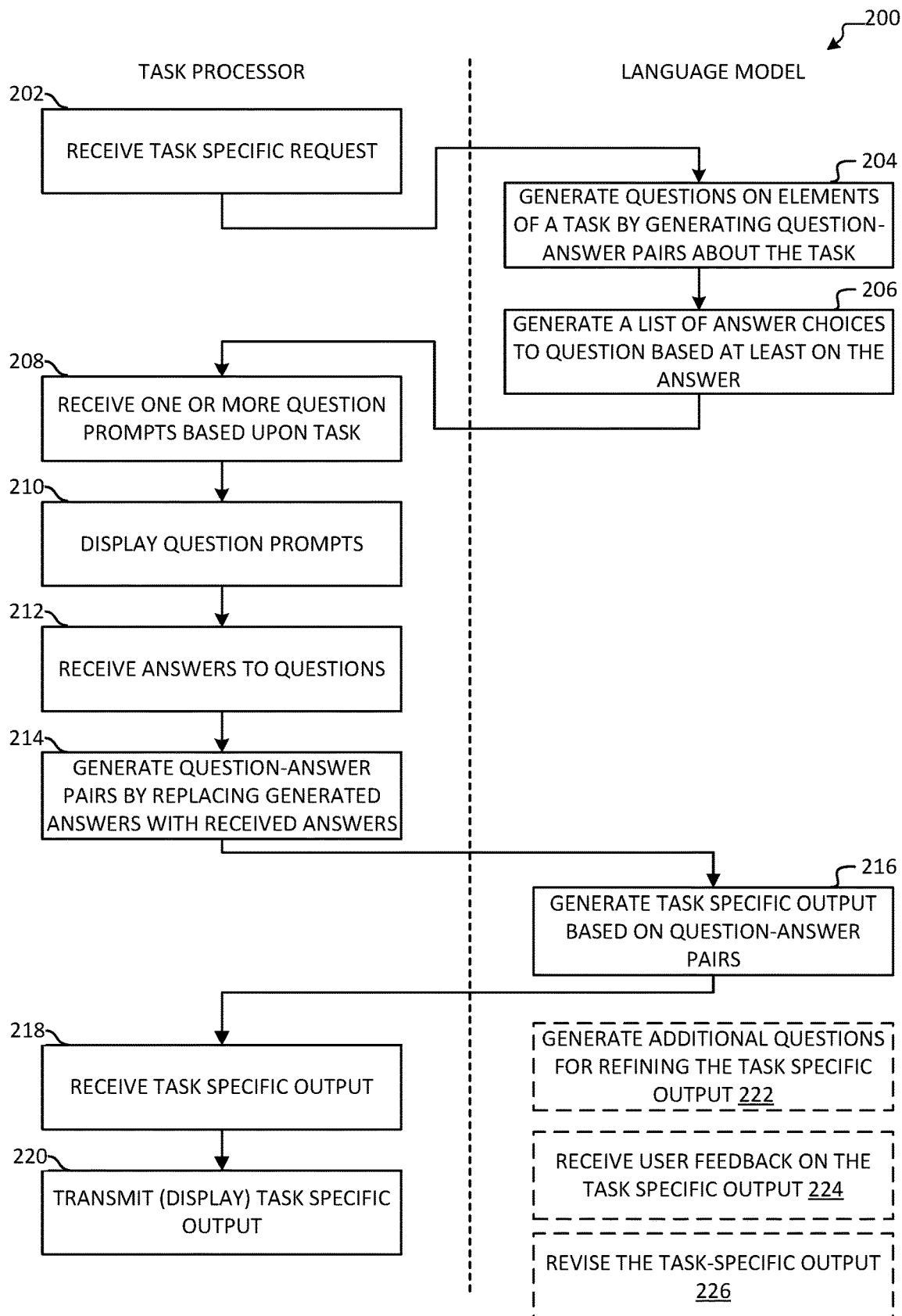
FIG. 2 illustrates an example of a method for generating task specific output using a machine learning model in accordance with aspects of the present disclosure.

FIG. 2 illustrates an example of a method for generating task specific output using a machine learning model in accordance with aspects of the present disclosure. Flow being at operation 202, where a task specific request is received. The task specific request identifies a task that is to be performed by the machine learning model. For example, the task may be, but is not limited to, generating a user biography, generating travel plans, generating dialog, generating written works, generating event summaries, etc. In examples, the task specific information received at the receive task specific request operation 202 is analyzed to determine a task based upon the parameters of the request and/or based upon a contextual analysis of the request.

Additionally, or alternatively, the receive task specific request operation 202 receives one or more keywords associated with the task being requested. The one or more keywords improves accuracy of a list of questions generated by the language model by clarifying a term used for specifying a task. For example, for requesting a task of generating a wedding invite, examples of keywords may include "ceremony," and "reception" as to clarify that the invitation is for both a wedding ceremony and a reception. The language model may generate a list of question-answer pair by taking the keywords into account.

Figure 3A:
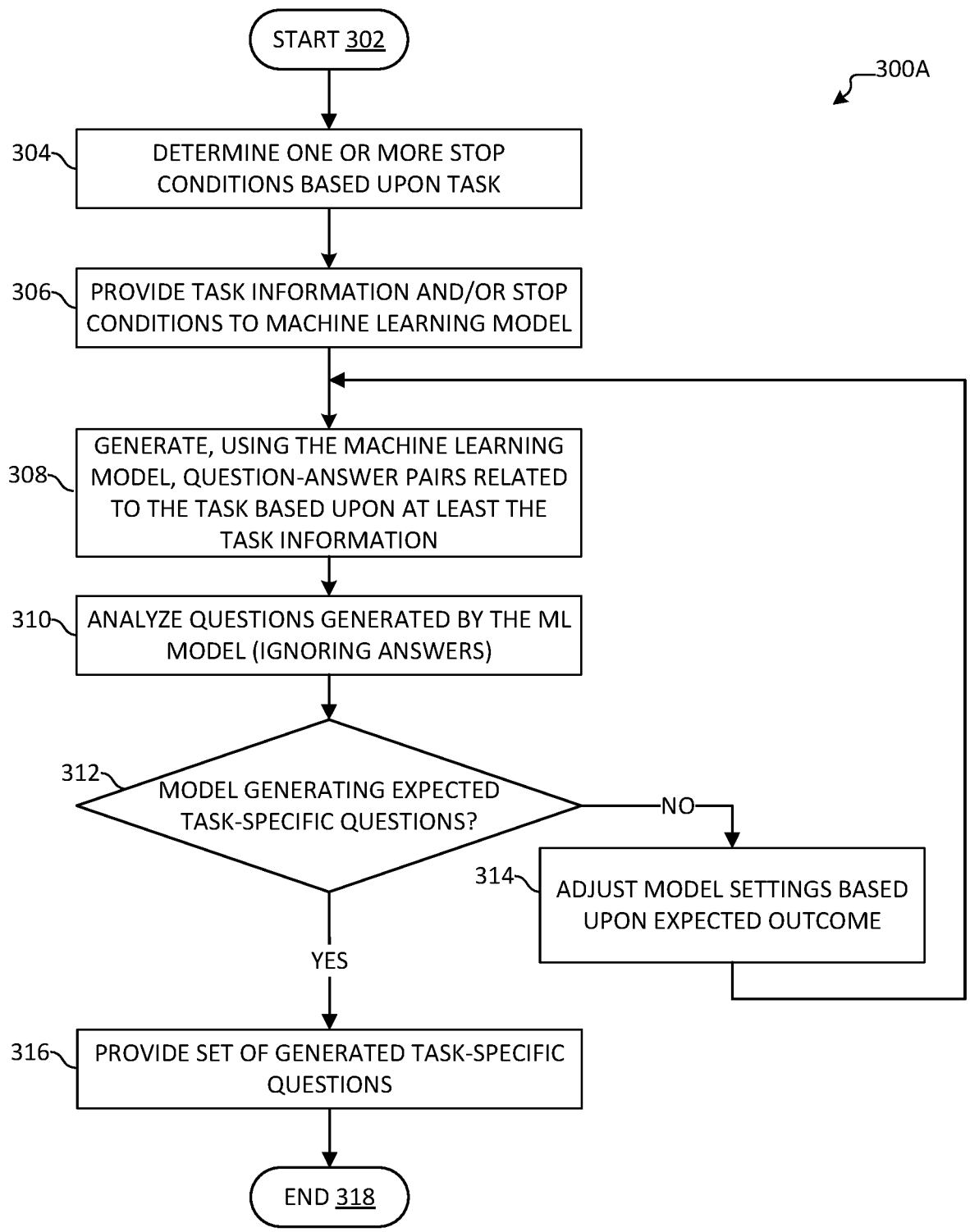
FIG. 3A illustrates an example of a method for generating a plurality of questions in accordance with aspects of the present disclosure.

At generate questions operation 204, information from the received task request and/or contextual information derived from the task related request is analyzed using a machine learning model, such as a transformer model, an LLM model, or the like. The type of model used may differ based upon the type of content being generated. Further, multimodal models may be used, for example, to generate images, audio, video, or other type of content. The machine learning model uses the information to generate a series of questions related to the task. In particular, the machine learning model generates a list of question-answer pairs that relates to the task. In doing so, the machine learning model identifies types of information that is relevant to the task and generates questions and answers to the questions based upon the relevant types of information. The generate questions operation 204 proceeds by generating the series of questions by extracting the questions from the set of question-answer pairs. In examples, the generation questions operations discard the answers to the questions because a new set of answers to the questions is to be provide by the user. FIG. 3A of the attached appendix provides additional details related to generating questions based upon the requested task.

In aspects, at generate a list of answer choices operation 206, answer choices that are associated with a question of a question-answer pair is generated. The answer choices may be generated based at least on an answer portion of the question-answer pair. The task performer may present answer choices with their corresponding question for a selection by the user. Having answer choices enables receiving an answer that is within a breadth of scope from the user to a question, thereby enabling the language model to generate a task specific output that are accurate and consistent.

At receive one or more questions operation 208, the method 200 receives one more questions from the language model for display. In aspects, the one or more questions operation 208 further receives a list of answer choices for the one or more questions as generated by the generate a list of answer choices operation 206.

At display questions operations 210, one or more question prompts including the questions are displayed to the user through a client computing device. Turning now to FIG. 4A, an exemplary user interface 400A is provided that illustrates question prompts that may be generated at the generate questions operation 204 and displayed at display question operation 208. In the exemplary user interface 400A, a task request to generate a wedding invite is received. Based upon the exemplary task request, a series of relevant questions is generated and displayed in the user interface 400A.

Returning to FIG. 1, flow continues to receive answer operation 212, where, in response to displaying one or more question prompts related to the task, the method 200 receives answers to the questions. In one example, the answers may be received via user input entered into a user interface. For example, turning now to FIG. 4B, an exemplary user interface 400B is shown in which answers question prompts may be received. As shown in the user interface 400B, text-based answers are received via the user interface 400B in response to displaying the task related question prompts. Returning again to FIG. 1, the received answers are aggregated by the device performing to method 200 to generate a task specific output. In some examples, the received answers may be validated. That is, the received answers may be compared against an expected type of information to determine whether the answer is relevant to the question prompt. If the is not relevant, the user may be prompted again to answer the question until a relevant answer is received. Alternatively, or additionally, if a relevant answer is not received, the answer may be discarded such that it is not used to perform the requested task.

Upon receiving answers to the question prompts, flow continues to generate a revised list of question-answer pairs operation 214 where a set of question-answer pairs are generated based on the questions posed to the user and the answer received from the user to the questions. In aspects, the questions are substantially the same as the questions that have been generated by the language model. The answers that have been received from the user replaces the answers that have been generated by the language model for generating a revised set of question-answer pairs.

Upon generating the revised list of question-answer pairs, flow continues to generate task specific output operation 216 where task specific output is generated based upon the requested task using the revised list of question-answer pairs. In one example, the received answers are provided to a machine learning model. Alternatively, or additionally, the machine learning model may also receive task related parameters from the task request received at operation 202. In one example, the same machine learning model as the model used to generate the question prompts may receive the answers. Alternatively, a different machine learning model trained to perform a specific task may be used at operation 216. In response to receiving the answers, task specific output is generated.

The task specific output may expand upon the received answers to add additional content not specified by the user when generating the task specific output. For example, turning to FIG. 4C, an exemplary user interface 400C is provided which displays task specific output in response to receiving the answers. As shown in the user interface 400C, text for a wedding invitation is generated based upon the received answers. The wedding invitation text, generated by the machine learning model, includes additional content, thereby transforming the answers received in response to the question prompts into the requested task specific output (e.g., a wedding invitation in the depicted example).

At receive task specific output 218, a task specific output is received by the task processor. For example, the receive task specific output 218 receives text data that represent a wedding invite.

Additionally, or alternatively, the language model may generate (222) additional questions for refining the task specific output and transmits the additional questions for requesting further answers from the user.

Additionally, or alternatively, the language model may receive (224) user feedback on the task specific output for modification needed by the user. The feedback may be in the form of instructions or additional answers to the questions. Additionally, or alternative, the language model may revise (226) the task specific output based on answers to the additional questions and/or user feedback.

FIG. 3A illustrates an example of a method for generating a plurality of questions in accordance with aspects of the present disclosure. For example, the method 3A may be performed to generate the question prompts at operation 210 of FIG. 2. Flow begins at operation 304, where one or more stop conditions are determined based upon the task. The stop conditions may be parameters used by a machine learning model generating the question prompts to determine relevant questions to the task.

At operation 306, task related information, such as information received with the task request, contextual information derived from the task request, or the like, and/or stop conditions may be provided as input into a machine learning model. For example, the stop conditions may include at a time when the machine learning model generates more than one questions of the same question in question-answer pairs. In other aspects, the stop conditions include a lapse of a predetermined time from a start of generating one or more in question-answer pairs.

At operation 308, the machine learning model generates one or more questions in question-answer pairs related to the task based upon the task information and/or stop conditions received as input. The machine learning model analyzes the requested tasks and determines the type of information that can be used to complete the task. Upon determining the type of relevant information, the machine learning model generates one or more question prompts that can be used to request the relevant information.

At operation 310, the question prompts generated by the machine learning model may be analyzed to determine their relevance to the task. For example, the questions generated by the machine learning model may be analyzed to determine whether the questions are repetitive, redundant, or irrelevant to the requested task. At decision operation 312, the method 200 determines, based upon the analysis, whether the questions generated by the machine learning model match an expected output. For example, if the questions generated by the model are irrelevant to the requested task (e.g., asking for information that is not needed to perform the task), then it is determined that the model is not producing expected output. In said scenario, flow branches NO to operation 314 where the model's settings are adjusted. For example, the model's settings may be adjusted by adjusting the control temperature for the model, adjusting a max outputs size for the model, adding additional task specific instructions to the model (e.g., providing additional information from the task request), adding an example question relevant to the task as input to the model, etc. Flow then returns to operation 206 and the model is executed again to generate task related question prompts based upon the adjusted settings.

Returning to decision operation 312, if the model generates expected output, flow branches YES to operation 316 and the set of question prompts generated by the model is output to an application or displayed to a user (e.g., as shown in the exemplary user interface 400A).

Figure 3B:
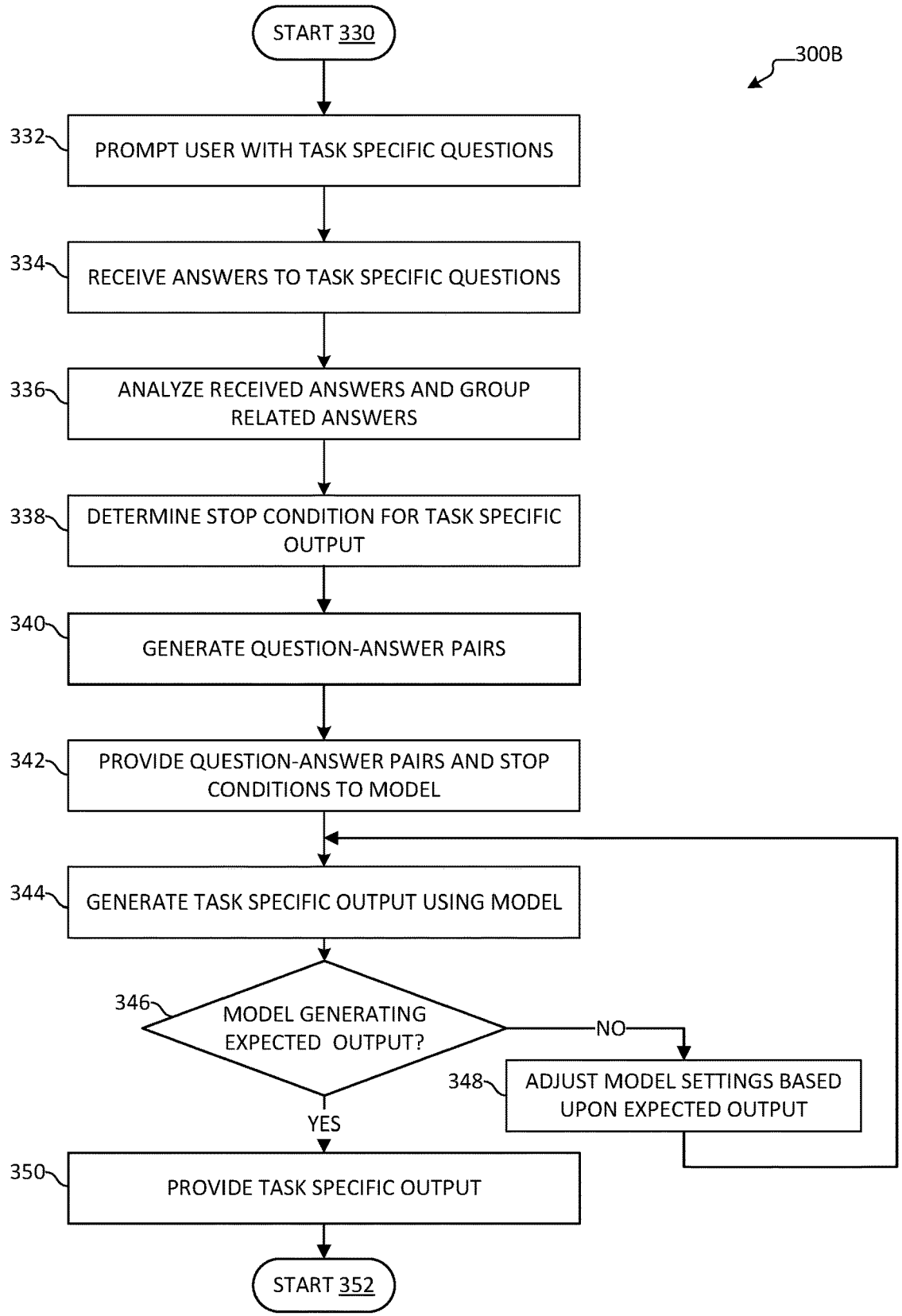
FIG. 3B illustrates an example of a method for generating task specific output in accordance with aspects of the present disclosure.

FIG. 3B illustrates an example of a method for generating task specific output in accordance with aspects of the present disclosure. Flow begins at a start operation 330 followed by operation 332 where the user is prompted with task specific questions. As discussed above, the task specific questions may be generated by a machine learning model. Of note, aspects of the present disclosure may be practiced with general language models. That is, the models used to generate the questions prompted at operation 332 does not have to be trained for a specific task being requested to execute. In response to prompting the user (or another application) with the task specific questions, flow continues to operation 334 where answers are received in response to prompting the user (or another application) with questions. For example, the answers to the questions may be received via a user interface, such as user interface 400B depicted in FIG. 4B.

At operation 336, the received answers may be analyzed. In one example, the answers may be analyzed to determine if they are responsive to the prompt questions. That is, the answers may be analyzed to determine whether they provide information that is relevant to the prompted question. The analysis may be performed by comparing the received answer to an expected answer or expected type of answer. Additionally, or alternatively, the received answers may be analyzed to determine whether two or more of the answers are dependent upon each other. Dependent answers may be grouped together when processed to generate the task specific output.

At operation 338, a stop condition is determined based upon the type of task. The stop condition determined at operation 338 may be provided as input to the machine learning model used to generate the task specific output in order to determine when the requested task is completed. For example, the stop conditions may be task related parameters that that are processed by the machine learning model to generate the task specific output. By utilizing the generated stop conditions and answers received based upon the question prompts, a general machine learning model may be used (e.g., a general language model) to generate the task specific output. That is, aspects of the present disclosure are operable to generate task specific output using a machine learning model that is not specifically trained to perform the requested task.

At operation 340, the answers and the stop conditions are provided as input to the machine learning model that is to be used to generate the task specific output. In one example, the machine learning model may be the same model that was used to generate the question prompts discussed above. Alternatively, a different machine learning model may receive the answer and stop condition information at operation 342. Flow then continues to operation 344 where the machine learning model generates task specific output in response to receiving the answers and stop conditions.

At decision operation 346, a determination is made as to whether the model generated expected output at operation 344. For example, if the output generated by the model is not related to the requested task, then it is determined that the model is not producing expected output. If the model is not producing expected output, flow branches NO to operation 348 where the model's settings are adjusted. For example, the model's settings may be adjusted by adjusting the control temperature for the model, adjusting a max outputs size for the model, adding example task specific output, adding an example question relevant to the task as input to the model, etc. Flow then returns to operation 346 and the model is executed again to generate task specific output. Returning to decision operation 346, if the model generates an expected output, flow branches YES to operation 350 where the output is provided to the user or another application. For example, referring again to FIG. 4C, the task specific output (e.g., a wedding invitation) may be displayed to the user requesting the task.

FIG. 4A depicts an exemplary user interface for displaying question prompts. The user interface 400A illustrates "A Wedding Invite" as a task being requested. The user interface 400A further includes a prompt to the user: "I am an expert in generating a wedding invite. I ask questions to gather information. Then, I use the information to generate a wedding invite for you." In aspects, the prompt sets an expectation to the user and eases communications between the user and the computing device (and thus the task processor) to be in a natural language. The user interface 400A further includes a list of questions being requested the user to answer. In examples of a task for generating a wedding invite, the set of questions include: 1. Who is hosting the wedding? 2. What is a name of the bride? 3. What is a name of the groom? 4. When does the wedding take place? 5. What is the location where the wedding is to take place? 6. What is the dress code for the wedding? A) Formal; B) Semi-formal; C) Casual" The computing device poses the questions for the user to input answers.

Additionally, or alternatively, a question may be presented with a list of answer choices. For example, question 6 "What is the dress code for the wedding?" may be with a list of answer choices (e.g., A) Formal; B) Semi-formal; C) Casual). Including a list of answer choices enables the user to confine an answer to one of the predetermined phrases in the answer choices. In aspects, an answer selection conveys a meaning of the answer more clearly than an answer in a free style text.

In aspects, the machine learning model generates a set of question-answer pairs for a given task. The task processor generates a list of questions by extracting questions from the set of question-answer pairs. The task processor may discard the answers from the generated set of question-answer pairs. The list of questions is in line with executing the task because the list of questions is based on the pair of question-answers that the trained machine learning model has generated according to the given task.

FIG. 4B depicts an exemplary user interface in which answers question prompts may be received. The user interface 400B illustrates an example of a screen where the user has entered answers to the list of questions associated with the task of generating a wedding invite. The screen indicates, in addition to the prompt as shown in FIG. 4A, "Please answer the following questions: 1. Who is hosting the wedding? John Doe. 2. What is a name of the bride? Jeal Anderson. 3. What is a name of the groom? John Doe. 4. When does the wedding take place? 10 am on Aug. 14, 2022. 5. What is the location of the wedding? The Seattle Wedding Place. 6. What is the dress code for the wedding? A) Formal." Following the questions and the respective answers, the user interface 400B further indicates a command by the user to the task processor: "Command: Write a wedding invite based on the questions and the answers above." In examples, the user has selected "A) formal" from the three answer choices that were presented to the user with the question (e.g., question 6).

FIG. 4C depicts an exemplary user interface which displays task specific output in response to receiving the answers. The user interface 400C illustrates an example command of a task for generating a wedding invite and a task specific output: "Command: Write a wedding invite based on the questions and the answers above. Task Specific Output: Together with their families, John Doe and Jeal Anderson request your presence at their Wedding at 10 o'clock in the morning of 14 Aug. 2022, at Seattle Wedding Place. Reception to follow. Formal attire (e.g., morning dress) is requested."

In aspects, the task specific output includes enhanced text expressions based on the answers given to the questions. For example, the language model added a phrase "morning dress" to the statement "Formal attire (e.g., morning dress) is required." The language model added "morning dress" as a further inference of the formal attire for this particular wedding event because among the answers to the questions have indicated that the wedding event starts in the morning hours (e.g., at 10 o'clock in the morning).

Figure 5:
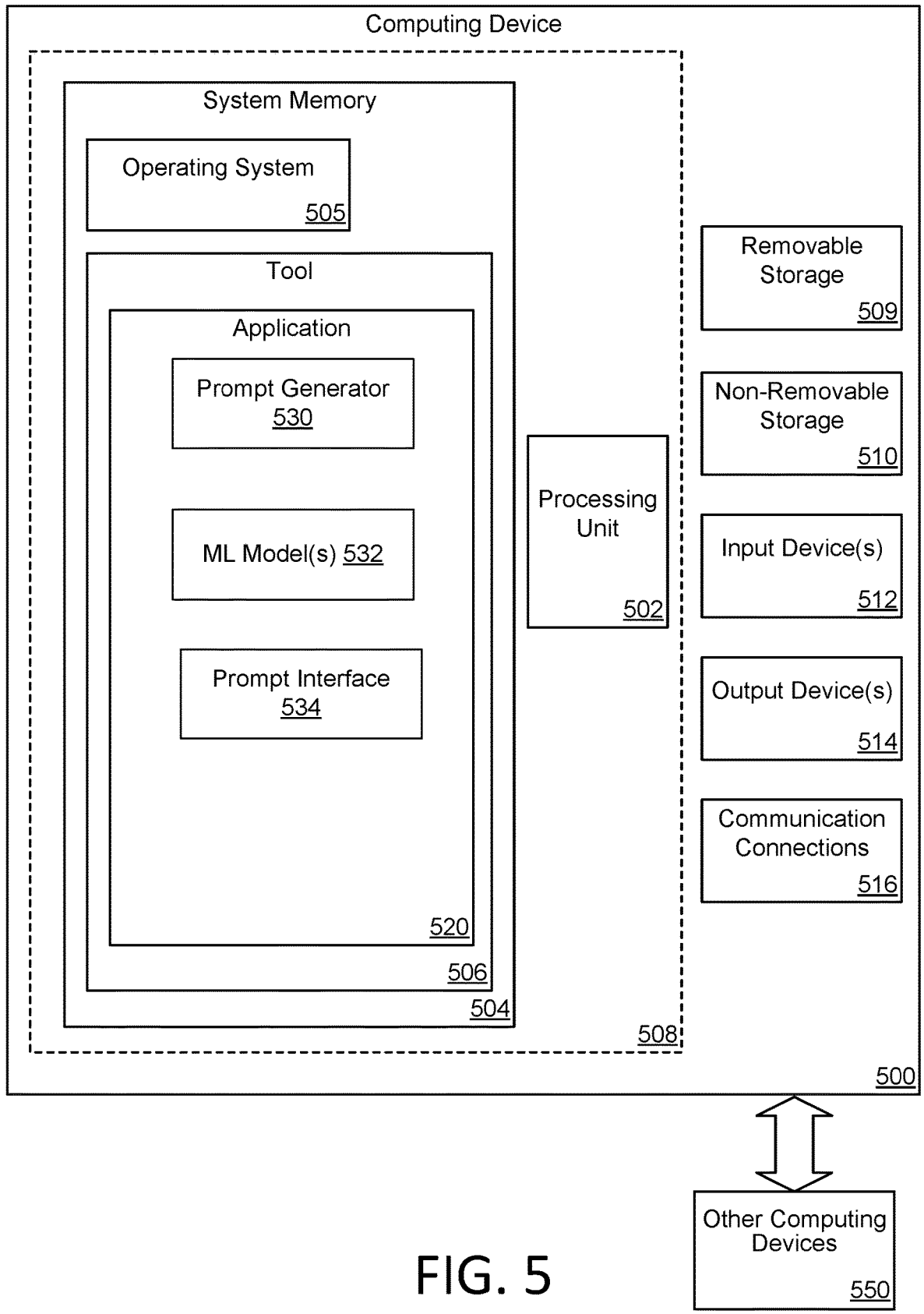
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program tools 506 suitable for performing the various aspects disclosed herein such. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program tools and data files may be stored in the system memory 504. While executing on the at least one processing unit 502, the program tools 506 (e.g., an application 520) may perform processes including, but not limited to, the aspects, as described herein. The application 520 includes a prompt generator 530, one or more machine learning models 532, and/or prompt user interface 534 as well as instructions to perform the various processes disclosed herein. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 500 may also have one or more input device(s) 512, such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of the communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
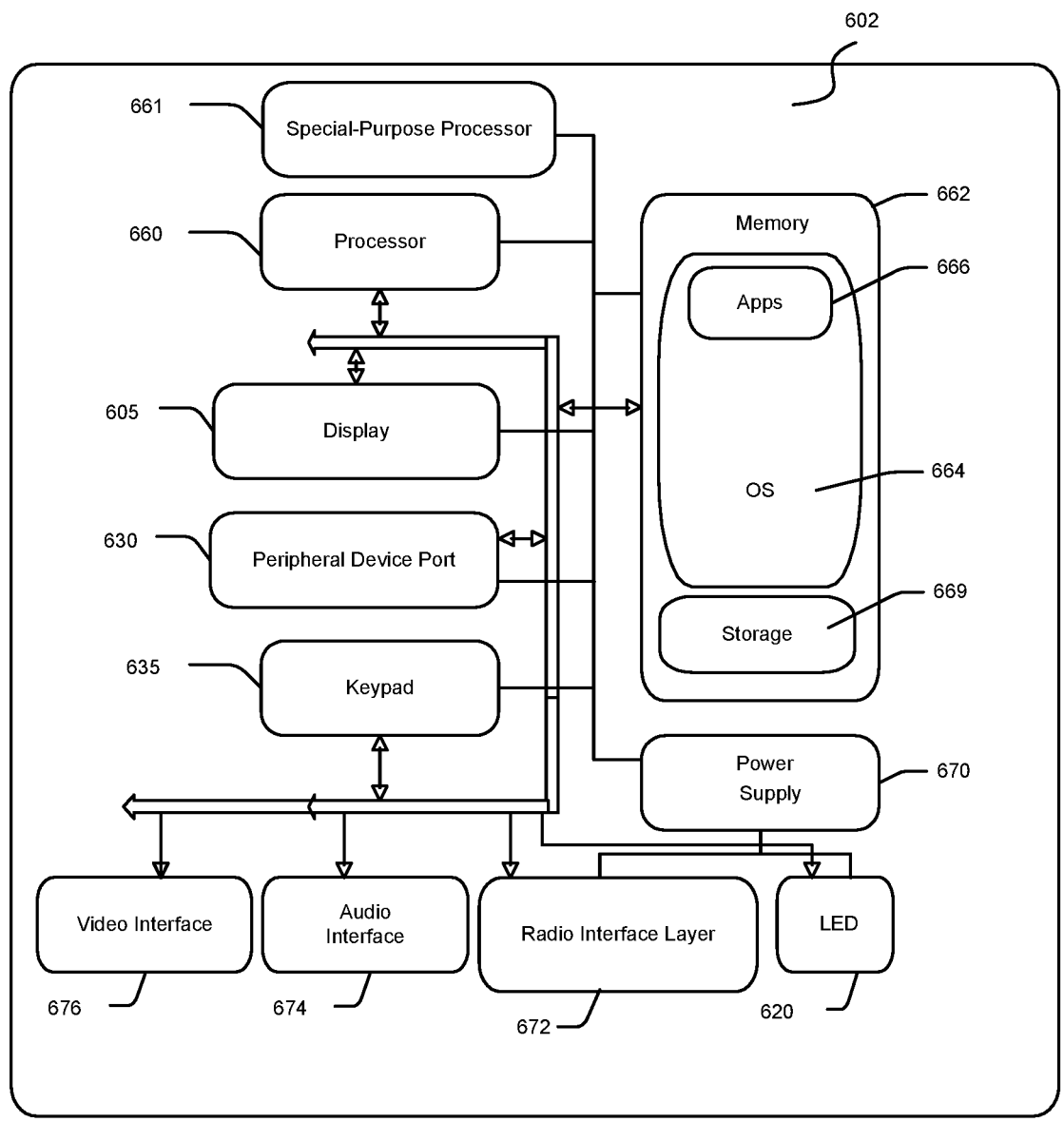
FIG. 6 is a simplified block diagram of a mobile computing device with which aspects of the present disclosure may be practiced.

FIG. 6 illustrates system 602 of a computing device. Examples of computing device include, but are not limited to, a mobile telephone, a smart phone, wearable computer (such as a smart watch), a tablet computer, a laptop computer, and the like, with which aspects of the disclosure may be practiced. In some aspects, the client utilized by a user may be a mobile computing device. FIG. 6 is a block diagram illustrating the architecture of one aspect of computing device, a server, a mobile computing device, etc. System 602 can be implemented as a "smart phone" capable of running one or more applications (e.g., browser, e-mail, calendaring, contact managers, messaging clients, games, and media clients/players). In some aspects, the system 602 is integrated as a computing device, such as an integrated digital assistant (PDA) and wireless phone.

One or more application programs 666 may be loaded into the memory 662 and run on or in association with the operating system 664. Examples of the application programs include phone dialer programs, e-mail programs, information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 868 synchronized with corresponding information stored at the host computer. As should be appreciated, other applications may be loaded into the memory 662 and run on the computing device described herein.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world" via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 (e.g., LED) may be used to provide visual notifications, and/or an audio interface 674 may be used for producing audible notifications via the audio transducer 625. In the illustrated configuration, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of devices connected to a peripheral device port 630 to record still images, video stream, and the like.

A computing device (e.g., client computing device 102 as shown in FIG. 1) implementing the system 602 may have additional features or functionality. For example, the computing device may also include additional data storage devices (removable and/or non-removable) such as, magnetic disks, optical disks, or tape. Such additional storage is illustrated in FIG. 6 by the non-volatile storage area 668.

Data/information generated or captured by the computing device and stored via the system 602 may be stored locally on the computing device, as described above, or the data may be stored on any number of storage media that may be accessed by the device via the radio interface layer 672 or via a wired connection between the computing device and a separate computing device associated with the computing device, for example, a server computer in a distributed computing network, such as the Internet. As should be appreciated such data/information may be accessed via the computing device via the radio interface layer 672 or via a distributed computing network. Similarly, such data/information may be readily transferred between computing devices for storage and use according to well-known data/information transfer and storage means, including electronic mail and collaborative data/information sharing systems.

The present disclosure relates to systems and methods for generating task specific output based upon answers to one or more prompts. A method comprises receiving a task specific request; generating, using a machine learning model, one or more question prompts based upon the task specific request, wherein the machine learning model is a generative model trained using a general unsupervised training process; displaying the one or more question prompts; receiving one or more answers corresponding to the one or more question prompts; and generating task specific answers based upon the one or more question prompts. The generating one or more question prompts further comprises generating one or more question-answer pairs based upon the task specific request using the machine learning model; and extracting the one or more question prompts from the one or more question-answer pairs. The generating one or more question prompts further comprises generating one or more question-answer pairs based upon the task specific request using the machine learning model; generating, based on an answer in the one or more question-answer pairs, one or more answer choices associated with a question corresponding to the answer; and generating the one or more question prompts, wherein the one or more question prompts includes a set of the question and the one or more answer choices associated with the question. The machine learning model includes a trained language model. The task specific request includes a keyword that further specifies a task in the task specific request. The method further comprises determining a level of similarity in semantics between an answer of the one or more answers and a question associated with the answer; determining, based on similarity in semantics, the answer as being insufficient for generating the task specific answers; generating an additional question associated with the question; and displaying the additional question. The method further comprises receiving a feedback to the task specific answers; and updating, based on the feedback, at least a part of content of the task specific answers.

Another aspect of the technology relates to a method. The method comprises providing, as input into a machine learning model, task information relates to a requested task; generating, using the machine learning model, one or more question prompts related to the requested task, wherein the one or more question prompts relate to information used to complete the requested task, and wherein the machine learning model is a generative model trained using a general unsupervised training process; and generating, based on one or more answers associated with the one or more question prompts using the machine learning model, output of the requested task. The method further comprises comprising providing one or more stop conditions to the machine learning model. The method further comprises analyzing the one or more question prompts to determine whether the one or more question prompts are related to the requested task. The generating one or more question prompts further comprises generating one or more question-answer pairs based upon the requested task using the machine learning model; and extracting the one or more question prompts from the one or more question-answer pairs. The generating one or more question prompts further comprises generating one or more question-answer pairs based upon the requested task using the machine learning model; generating, based on an answer in the one or more question-answer pairs, one or more answer choices associated with a question corresponding to the answer; and generating the one or more question prompts, wherein the one or more question prompts includes a set of the question and the one or more answer choices associated with the question. The machine learning model includes a trained language model. The task information includes a keyword that further specifies the requested task. The method further comprises receiving the one or more answers; determining a level of similarity in semantics between an answer of the one or more answers and a question associated with the answer; determining, based on similarity in semantics, the answer as being insufficient for generating task specific answers; generating an additional question associated with the question; and providing the additional question. The method further comprises receiving a feedback to the one or more answers; and updating, based on the feedback, at least a part of content of the one or more answers.

In still further aspects, the technology relates to a method. The method comprises receiving answers to task specific question prompts; determining one or more stop conditions related to a requested task; and generating task specific output using a machine learning model, wherein the machine learning model receives the answers and the task specific question prompts as input and generates the task specific output, wherein the machine learning model is a generative model trained using a general unsupervised training process. The machine learning model is not trained to perform the requested task. The method further comprises generating one or more question-answer pairs based upon the requested task using the machine learning model; extracting the task specific question prompts from the one or more question-answer pairs; modifying the one or more question-answer pairs by replacing each answer of the one or more question-answer pairs by one or more answers of the received answers; and generating, based on the modified one or more question-answer pairs, the task specific output using the machine learning model. The method further comprises generating, using the machine learning model, the task specific question prompts based upon the requested task; and displaying the task specific question prompts.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Any of the one or more above aspects in combination with any other of the one or more aspect. Any of the one or more aspects as described herein.

What is claimed is:

1. A method for generating task specific output based upon answers to one or more prompts, comprising:
   receiving a task specific request;
   generating, by a trained machine learning model, one or more question prompts based upon the task specific request, wherein the trained machine learning model represents a pre-trained generative model that generates task specific output of the task specific request;
   displaying the one or more question prompts;
   receiving one or more answers corresponding to the one or more question prompts, wherein the one or more answers represent at least a part of information as input to perform the task specific request; and
   generating, by the trained machine learning model, a task specific output based upon the one or more question prompts and the received one or more answers.

2. The method of claim 1, wherein the generating one or more question prompts further comprises:
   generating one or more question-answer pairs based upon the task specific request using the trained machine learning model; and
   extracting the one or more question prompts from the one or more question-answer pairs.

3. The method of claim 1, wherein the generating one or more question prompts further comprises:
   generating one or more question-answer pairs based upon the task specific request using the trained machine learning model;
   generating, based on an answer in the one or more question-answer pairs, one or more answer choices associated with a question corresponding to the answer; and
   generating the one or more question prompts, wherein the one or more question prompts includes a set of the question and the one or more answer choices associated with the question.

4. The method of claim 1, wherein the trained machine learning model includes a trained language model.

5. The method of claim 1, wherein the task specific request includes a keyword that further specifies a task in the task specific request.

6. The method of claim 1, further comprising:
   determining a level of similarity in semantics between an answer of the one or more answers and a question associated with the answer;
   determining, based on similarity in semantics, the answer as being insufficient for generating the task specific output;
   generating an additional question associated with the question; and
   displaying the additional question.

7. The method of claim 1, further comprising:
   receiving a feedback to the task specific output; and
   updating, based on the feedback, at least a part of content of the task specific output.

8. A method comprising:
   providing, as input into a trained machine learning model, task information relates to a requested task;
   generating, by the trained machine learning model, one or more question prompts related to the requested task, wherein the one or more question prompts relate to information used to complete the requested task, and wherein the trained machine learning model represents a pre-trained generative model that generates task specific output of the requested task; and
   generating, by the trained machine learning model, based on one or more answers associated with the one or more question prompts, a task specific output of the requested task, wherein the one or more answers represent at least a part of information as input to perform the requested task.

9. The method of claim 8, further comprising providing one or more stop conditions to the trained machine learning model.

10. The method of claim 8, further comprising analyzing the one or more question prompts to determine whether the one or more question prompts are related to the requested task.

11. The method of claim 8, wherein the generating one or more question prompts further comprises:
generating one or more question-answer pairs based upon the requested task using the trained machine learning model; and
extracting the one or more question prompts from the one or more question-answer pairs.

12. The method of claim 8, wherein the generating one or more question prompts further comprises:
generating one or more question-answer pairs based upon the requested task using the trained machine learning model;
generating, based on an answer in the one or more question-answer pairs, one or more answer choices associated with a question corresponding to the answer; and
generating the one or more question prompts, wherein the one or more question prompts includes a set of the question and the one or more answer choices associated with the question.

13. The method of claim 8, wherein the trained machine learning model includes a trained language model.

14. The method of claim 8, wherein the task information includes a keyword that further specifies the requested task.

15. The method of claim 8, further comprising:
receiving the one or more answers;
determining a level of similarity in semantics between an answer of the one or more answers and a question associated with the answer;
determining, based on similarity in semantics, the answer as being insufficient for generating the task specific output;
generating an additional question associated with the question; and
providing the additional question.

16. The method of claim 8, further comprising:
receiving a feedback to the one or more answers; and
updating, based on the feedback, at least a part of content of the one or more answers.

17. A method comprising:
receiving one or more answers to task specific question prompts, wherein the one or more answers represent at least a part of information as input to perform a requested task;
determining one or more stop conditions related to the requested task; and
generating, by a trained machine learning model, task specific output, wherein the trained machine learning model receives the one or more answers and the task specific question prompts as input and generates the task specific output of the requested task, and the trained machine learning model represents a pre-trained generative model.

18. The method of claim 17, wherein the trained machine learning model is not trained to perform the requested task.

19. The method of claim 17, further comprising:
generating one or more question-answer pairs based upon the requested task using the trained machine learning model;
extracting the task specific question prompts from the one or more question-answer pairs;
modifying the one or more question-answer pairs by replacing each answer of the one or more question-answer pairs by one or more answers of the received answers; and
generating, based on the modified one or more question-answer pairs, the task specific output using the trained machine learning model.

20. The method of claim 17, further comprising:
generating, using the trained machine learning model, the task specific question prompts based upon the requested task; and
displaying the task specific question prompts.

* * * * *